United States Patent

Haberstroh

[11] Patent Number: 5,351,804
[45] Date of Patent: Oct. 4, 1994

[54] DEVICE FOR THE TRANSPORTATION OF OBJECTS

[76] Inventor: Karl Haberstroh, Hohenkrahenstr. 2, D-7703 Rielasingen, Fed. Rep. of Germany

[21] Appl. No.: 22,131

[22] Filed: Feb. 25, 1993

[30] Foreign Application Priority Data

Feb. 29, 1992 [DE] Fed. Rep. of Germany ....... 4206364
Jul. 30, 1992 [DE] Fed. Rep. of Germany ....... 4225147

[51] Int. Cl.$^5$ .............................................. B65G 47/84
[52] U.S. Cl. ............................... 198/478.1; 198/473.1; 198/487.1; 198/493; 198/778; 134/68; 134/126; 134/159
[58] Field of Search ............... 198/470.1, 473.1, 478.1, 198/487.1, 493, 608, 778, 803.1–803.12, 803.15, 803.01; 134/66–68, 126, 128, 158, 159

[56] References Cited

U.S. PATENT DOCUMENTS

| | | | |
|---|---|---|---|
| 237,074 | 1/1881 | Baldwin | 198/803.1 |
| 807,541 | 12/1905 | Cunningham et al. | 198/803.1 |
| 2,360,209 | 10/1944 | Dalrymple | |
| 2,988,199 | 6/1961 | Pinkham | 198/803.1 |
| 3,339,698 | 9/1967 | Hartmeister et al. | 198/493 |
| 3,481,347 | 12/1969 | Corbett | 134/159 |
| 3,628,448 | 12/1971 | Boer | 198/803.15 |
| 3,951,158 | 4/1976 | Tedden | 134/73 |
| 4,475,646 | 10/1984 | Waas | 198/803.15 |
| 5,033,158 | 7/1991 | Petho | 134/128 |
| 5,127,514 | 7/1992 | Guttinger et al. | 198/803.01 |

FOREIGN PATENT DOCUMENTS

| | | |
|---|---|---|
| 2286771 | 4/1976 | France. |
| WO8706921 | 11/1987 | PCT Int'l Appl. |
| 753518 | 7/1956 | United Kingdom. |

Primary Examiner—Joseph E. Valenza
Attorney, Agent, or Firm—Bachman & LaPointe

[57] ABSTRACT

In a device for the transportation of objects, in particular of hollow bodies such as aerosol cans, through a washing, rinsing and/or drying zone and/or for the delivery of hollow bodies from one transport element to another, bars (18) are designed to be disposed in parallel on a roller (11), a belt (27) or the like. The mutually aligned side walls of the bars exhibit concave depressions (17), thereby forming a receiving fixture (20) for the hollow body (2).

18 Claims, 8 Drawing Sheets

DEVICE FOR THE TRANSPORTATION OF OBJECTS

The invention relates to a device for the transportation of objects, in particular of hollow bodies such as aerosol cans, through a washing, rinsing and/or drying zone and/or for the delivery of hollow bodies from one transport element to another.

Aerosol cans or hollow bodies of similar kind generally consist, nowadays, of aluminum or tinplate and are manufactured by the deep-drawing process. In the realization of this lubricants are added so that, prior to any further treatment of the can, cleaning is essential. The industrial cleaning of these cans takes place in washing zones of washing machines, the cans to be cleaned being guided through the washing zone, where appropriate with a pre-rinse zone, by means of various deflection rollers. To enable the suds to make their way into the interior of the can, the can should be guided in a horizontal position.

After the washing zone the can is rinsed in various rinsing zones, here too the can being guided through the rinsing zone, via deflection rollers, by the transport chain. This takes place, of course, with the can likewise in horizontal alignment, said can additionally being secured by sideplates or the like against floating off. The cans are thus located on spikes on the chain. After the rinsing zone, it is usual to take the cans from the transport chain and feed them onward to a special drying room. The can was intended to be guided into this drying room with the opening downwards and subjected to warm air. A device of this type is described, for example, in WO 87/06921.

The washing machines which have hitherto been known have the disadvantage that the cans, when guided on spikes, are not held in a secured position. For this reason there always have to be additional mechanisms available for preventing the cans from floating off. Furthermore, an air cushion can form in the can so that the can is guided, at least partially in the washing and/or rinsing zone, tilted on a spike. The air cushion prevents the bottom of the can from being wetted with suds or rinsing water.

The delivery of the cans from one chain to the other also involves considerable risks. In order to avoid these additional work steps, a single transport chain for guiding the cans through the washing, rinsing and drying zones is proposed in WO 87/06921. In this case, however, the chain is subject to considerable wear.

The object of the present invention is to develop a device of the abovementioned type, in which the can is guided through a washing and/or rinsing zone with the can in a secured position and/or in which the delivery of a can from one transport chain to the other is made substantially easier.

This object is achieved by the fact that bars are disposed in parallel on a roller, a belt or the like, the mutually aligned side walls of the bars exhibiting concave depressions, thereby forming a receiving fixture for the hollow body.

This receiving fixture is designed such that it corresponds approximately to the contour of the hollow body, yet envelops said hollow body at a small distance apart. If the hollow body is a cylindrical can, for example, then the receiving fixture is to be configured having an approximately circular cross section and is to exhibit a diameter which is slightly greater than the diameter of the hollow body. The concave depressions have the effect, above all, that the receiving fixture, apart from a small slot, is closed in the direction of the roller periphery formed by the surface of the bar, i.e. the hollow body can only be carried in or out of the receiving fixture approximately parallel to the roller axis, but cannot float off out of the roller shell. To this extent, a substantially better secured retention and guidance of the hollow body is obtained, especially as certain adhesion forces are additionally active in the receiving fixture. Furthermore, a horizontal guidance of the hollow body is also maintained, so that there is scarcely any possibility of an air cushion building up in the hollow body. If this does occur however, then even the bottom of the hollow body is still fully wetted with suds or rinsing fluid, since the hollow body jointly rotates upon the rotation of the roller but does not automatically rotate in the receiving fixture.

Preferably, the bars consist of a plastics material which is substantially less prone to wear when exposed to the aggressive suds.

For the retention of the bar there is additionally provided, in one illustrative embodiment, a profile which engages into the bar by means of claw strips and secures it to the roller or belt. The securement of the profile can then be taken care of, for example, by screws or the like.

In the case of cans having a relatively small neck diameter, it has proved difficult to deliver these cans from a receiving fixture of a roller or of a subsequently described belt onto a spike since, due to the small can diameter, a relatively high degree of accuracy or an alignment of the spike to the receiving fixture is necessary. A solution to this problem is offered by a bar which has no continuous receiving fixture of the same diameter, but which, facing the spike, is closed off by a filling and exhibits merely a semi-bore for receiving part of the spike. In the usage position, a bore is formed by two adjacently situated bars, which enclose the spike and hold it in this way. As a result, the spike is not only centered in relation to a can opening, but the spike is also largely prevented from wobbling. For this purpose, the spike should be disposed in the receiving fixture such that its tip is located close to the receiving fixture from which a can is transferred to the spike. Here, many options are conceivable and are intended to be covered by the inventive concept.

In the illustrative embodiment of the invention displaying the roller, which roller exhibits a plurality of corresponding receiving fixtures close to its periphery, the said roller is seated on a rotary shaft and is driven by a corresponding drive system. In the second illustrative embodiment of the invention, the bars are disposed on a belt, this belt at least partially looping round an upper conveyor end and a lower conveyor end. Although a roller has advantages with regard to the securement of the bars, it can also give rise to considerable spatial problems. Only a certain number of receiving fixtures can be provided on a roller periphery, which number depends upon the diameter of the hollow body. The more receiving fixtures are to be provided per roller, the greater the diameter of this roller becomes, but the core of the roller represents in this case a dead space. This disadvantage could be offset by the belt according to the invention, the washing container also being able, for example, to be kept very narrow, but exhibiting, in return, a greater height. A further basic advantage of the belt lies however in the fact that the diameter of the receiving fixture is greater during the deflection of the belt, i.e. as it loops round the upper and lower conveyor ends, so that a can is here able to be guided more easily into or out of the receiving fixture. On the straight sections between the upper and lower conveyor ends on the other hand, the diameter of the receiving fixture decreases, so that the can is better enclosed and hence more firmly held. This obviates the need for any measure designed to prevent the cans from floating off. Any clamping of the cans is to be avoided however.

The cans are preferably carried in and out of the receiving fixtures by means of a nozzle, from which the cans are bombarded with compressed air. Here too, other flow media are however conceivable. Opposite the nozzle, a stop is designed to project at least from time to time into the clear width of the receiving fixture, thereby preventing the can from being unintentionally shot through a receiving fixture. The arrangement of such a stop must however be tailored to the corresponding circumstances and requirements.

Whilst the rollers just described are jointly located on a rotary shaft, it can be desirable for the rollers within the washing and rinsing zones to be disposed differently. Here, for example, a 90° rotation of the roller towards the direction of conveyance is conceivable, so that each roller possesses its own rotary shaft. Maintenance and exchange of the rollers, where damaged for example, is thereby facilitated. Furthermore, each roller can also be independently driven, which is in many cases desirable. A relatively short rotary shaft requires none of the additional support which is necessary in relation to a shaft, running in the direction of conveyance, which passes through the whole of the container.

If the receiving fixtures are disposed transversely to the direction of conveyance, then a transfer of the cans from one roller to the other must take place. This is effected by means of a chain and corresponding spikes which are disposed on the chain and onto which the can is always in each case shot from a roller and transported to the next roller and there delivered into a receiving fixture. Accordingly, the chain runs between the individual rollers, guided approximately in wave formation on deflection rollers, but other designs are also conceivable. For the delivery, only that area of the roller above the container rim is feasible however, since the chain runs outside the container. It is also conceivable, in this case, for the chain simultaneously to guide the containers into the corresponding drying oven.

A roller of this type according to the invention or a belt of this type is intended to find application, on the one hand, in the washing zone and also, preferably, in the rinsing zone. The delivery of the cans is effected in this case from receiving fixture to receiving fixture, all the rollers being disposed on a common rotary shaft and the receiving fixtures being situated in an axis parallel to the axis of the rotary shaft. The same also applies to the arrangement of a belt, the upper conveyor end and the lower conveyor end being disposed, in this instance, on corresponding rotary shafts.

In a further embodiment of the invention, a roller of this type or a belt can also however be used as a mechanism for delivering hollow bodies from one chain to another or from a roller or belt to a chain. It is also of course conceivable for a roller according to the invention or a belt to be used in a washing machine purely as a delivery mechanism. In this instance, as previously, the hollow bodies are guided through the washing and rinsing zones on a chain. These and other possible applications are intended to be covered by the present inventive concept.

Further advantages, features and details of the invention can be derived from the following description of preferred illustrative embodiments and with reference to the drawing, in which.

Figure 1:
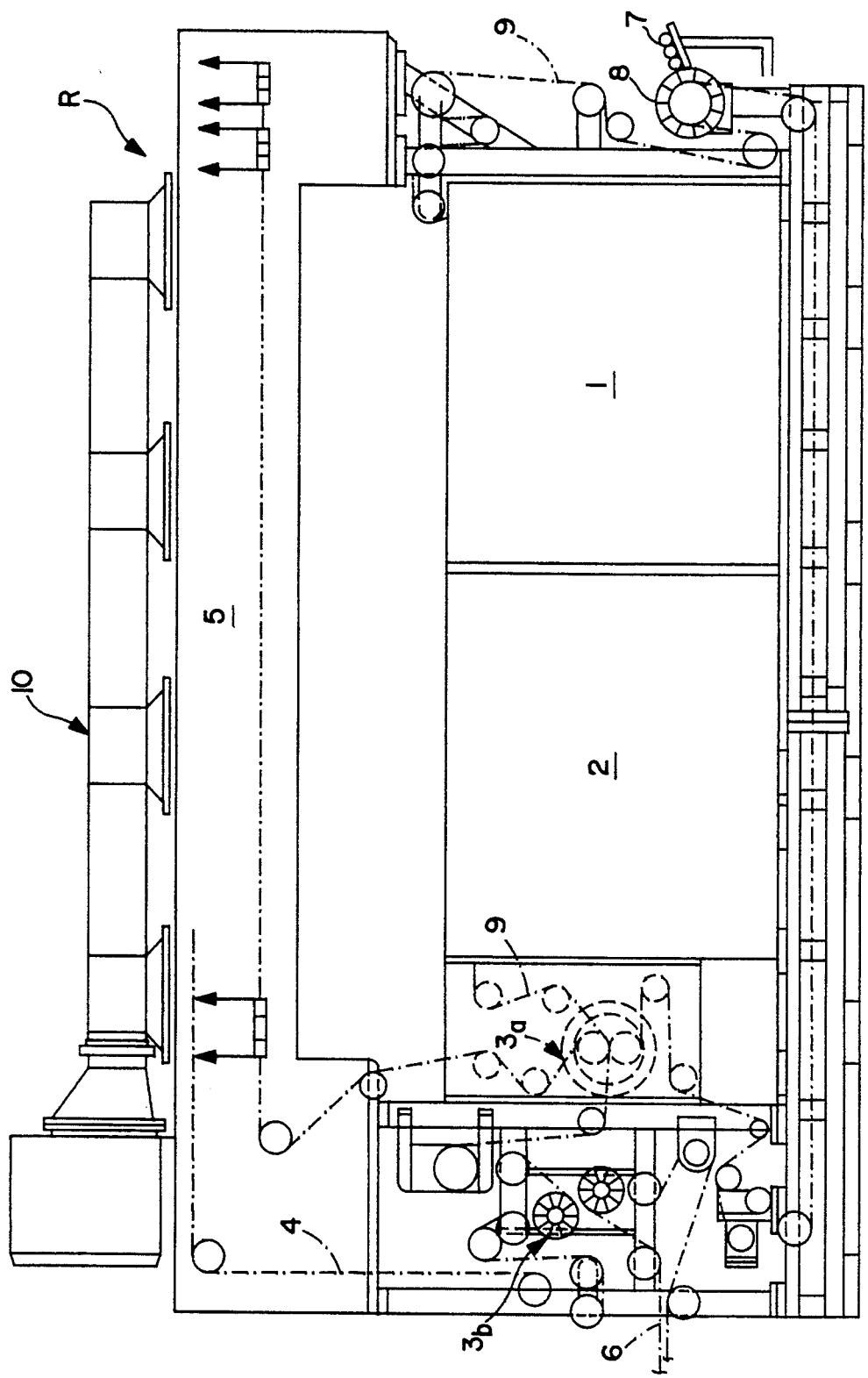
FIG. 1 shows a diagrammatically represented front view of a washing machine for cans according to the invention.

According to FIG. 1, a washing machine R according to the invention exhibits a washing zone 1 with, where appropriate, a pre-washing zone. This washing zone 1 is succeeded by a rinsing zone 2, to which there are adjoined delivery mechanisms 3. A delivery is effected in this case from the rinsing zone 2 to a conveyor chain 4, which is able to transport cans 7 into a drying oven 5. This first delivery mechanism is indicated by 3a. A second delivery mechanism 3b provides for cans to be delivered from the conveyor chain 4 onto a further chain 6 leading to a store.

The working method of the washing machine R according to the invention is as follows:

On the right side, cans 7 feed into a feed star 8. This feed star 8 corresponds to the prior art, the cans 7 being delivered from the said star onto a transport chain 9. This transport chain 9 guides the cans 7, via a plurality of deflection rollers (not identified in greater detail), into the washing zone 1. In this washing zone 1, the cans are guided through a washing liquid, once again by a plurality of deflection rollers, and cleaned. Afterwards, the cans 7 then feed into the rinsing zone 2, the can 7 being cleaned in this rinsing zone 2 with the detergent.

At the end, the transport chain 9 runs out of the rinsing zone 2 and passes the first delivery mechanism 3a. In this delivery mechanism 3a, which is still subsequently to be described as an illustrative embodiment, the cans are delivered from the transport chain 9 onto the conveyor chain 4. This conveyor chain 4 brings the cans 7 into the drying oven 5, in which the cans 7 are subjected to hot air. In order to introduce the hot air into the drying oven 5, a corresponding blower 10 is provided. Preferably, the cans 7 are guided in the drying oven 5 in erect alignment, the opening of the cans pointing downwards. A corresponding chain, which permits this alignment to be simply realized, is specified in P 42 00 579.5.

After leaving the drying oven 5, the conveyor chain 4 passes a further delivery mechanism 3b, in which the cans 7 are delivered onto the chain 6 to a store (not shown in greater detail).

Figure 3:
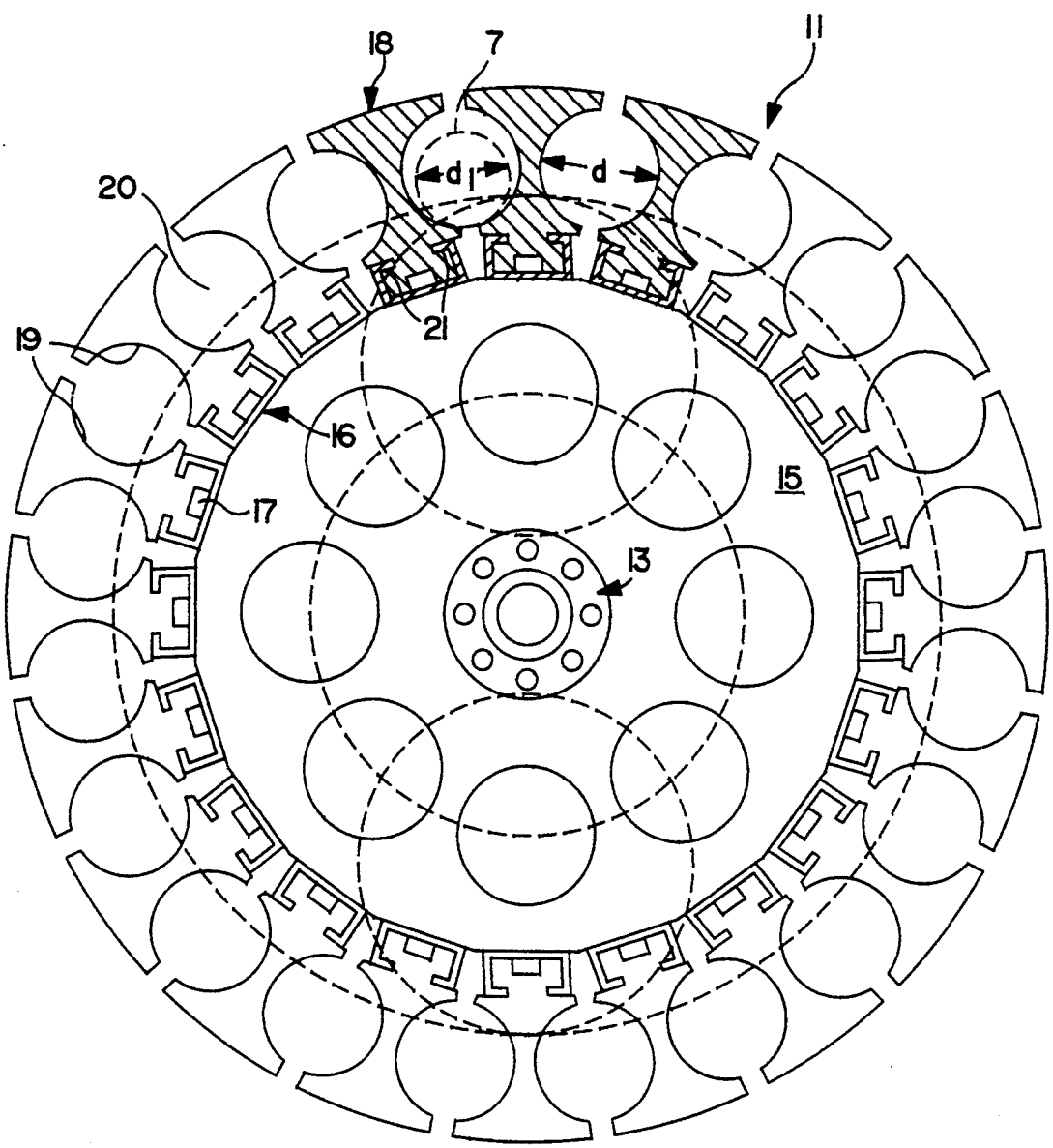
FIG. 3 shows a front view, in enlarged representation, of a roller according to the invention for the conveyance of cans.

According to the invention, the transport chain 9 is then intended to be replaced by rollers, which are preferably disposed in the washing and rinsing zones 1 and 2 and which serve to receive and guide the cans 7 through the washing and rinsing zones. In FIG. 3, rollers 11 of this type are shown, said rollers being seated in a container 12. This container 12 contains both the washing zone 1 and the rinsing zone 2, the corresponding zones being divided by a partition (not shown in greater detail), for example between two rollers 11.

In the container 12, the rollers 11 are mounted on a rotary shaft 13, so that a synchronous rotary movement of all the rollers 11 is performed. In this instance though, the rotary shaft 13, when it exits in each case from the container 12, requires a correspondingly sealed bearing shell 14. A drive system for the rotary shaft 13 is omitted for the sake of clarity.

An example of a roller 11 is shown in FIG. 3, partly in cross section. In this case, there is provided on the rotary shaft 13 a roller body 15, onto which, on the peripheral side, a plurality of equally spaced profiles 16 are screwed. The screwing-on is realized by means of corresponding screw bolts 17.

Each profile 16 is of claw-like configuration and holds a bar 18, a can 7 (indicated only in broken lines) being guided between two adjacent bars. For this purpose, concave depressions 19 are molded from both sides in each bar 18, so that a circular receiving fixture 20 is formed between two bars 18, the diameter d of which is slightly greater than a diameter d1 of the can 7. The can 7 is thereby able to slide in the receiving fixture 20.

The retention of the bar 18 is additionally taken care of by claw strips 21 which are provided on the profile 16. The delivery of a can 7 into the first roller 11a is preferably effected by compressed air, the can being able to be guided, for example, on a corresponding chain. Since, however, a relatively accurate centering of the can 7 in relation to the circular receiving fixture 20 is necessary for trouble-free delivery, the first roller 11a can be preceded, possibly even on the same rotary shaft 13, by a further roller possessing congruent receiving fixtures 20, excluding the fact that these receiving fixtures are open in the peripheral direction. As indicated for example in FIG. 1 at the feed star 8, the cans 7 can then fall from the side into these open receiving fixtures and be conveyed upwards. As soon as this open receiving fixture (not shown in greater detail) coincides with the circular receiving fixture 20a, the can is conveyed by a compressed air current out of the open receiving fixture into the receiving fixture 20a, the shot of the can being limited by a rod 23.

The can 7 can now be dipped into the detergent 1, the can essentially being held in the circular receiving fixture 20. Additional securing mechanisms, designed to prevent the can from floating off, can be omitted. In addition, excessive tipping of the cans is prevented by the circular receiving fixture 20, thereby also making it impossible for an air cushion to build up in the can 7. Furthermore, upon the rotation of the roller 11, the can 7 is jointly rotated, so that any air which might be present makes its escape.

In the present illustrative embodiment, the rotary shaft 13 rotates in the direction z, i.e. in the clockwise direction. Following a rotation of more than 360°, the can then attains, with the receiving fixture 20a, the position of the receiving fixture 20b shown in FIG. 2. Here, it is then possible to subject the can to compressed air from an air jet of a nozzle 22, as a result of which the can 7 is conveyed into a receiving fixture 20c in the succeeding roller 11b. The shot of the can is here limited by a rod 23a serving as a stop mechanism, which rod reaches in between the roller 11b and the roller 11c so that it lies in front of the opening of the receiving fixture 20c. Other options are also of course conceivable here.

Following rotation of the roller 11b by more than 360°, the recess 20c comes to be situated in front of a further nozzle 22b, which delivers a blast of air. The can 7 is thereby shot into a receiving fixture 20d of the roller 11c, the shot being once again limited by a rod 23b. The can then rotates in the roller 11c, this roller 11c being already located in the rinsing zone. The shooting of the can 7 from the roller 11b to the roller 11c is therefore effected over the top edge of an above-mentioned partition between the washing zone and the rinsing zone. Following a further rotation of the roller 11c by more than 360°, a further transportation of the can 7 to the roller 11d is then brought about, this being effected, once again, by means of compressed air from a nozzle 22c. By virtue of the roller 11d, the can rotates once again by more than 360° and then comes to rest in front of a nozzle 22d, the air blast from which carries out the can 7. At this moment, a spike 24 on a chain 25 is located close to the corresponding receiving fixture 20d of the roller 11d, so that the can 7 is shot onto this spike 24. The chain 25 then conveys the can 7, for example, into the drying oven 5.

Figure 4:
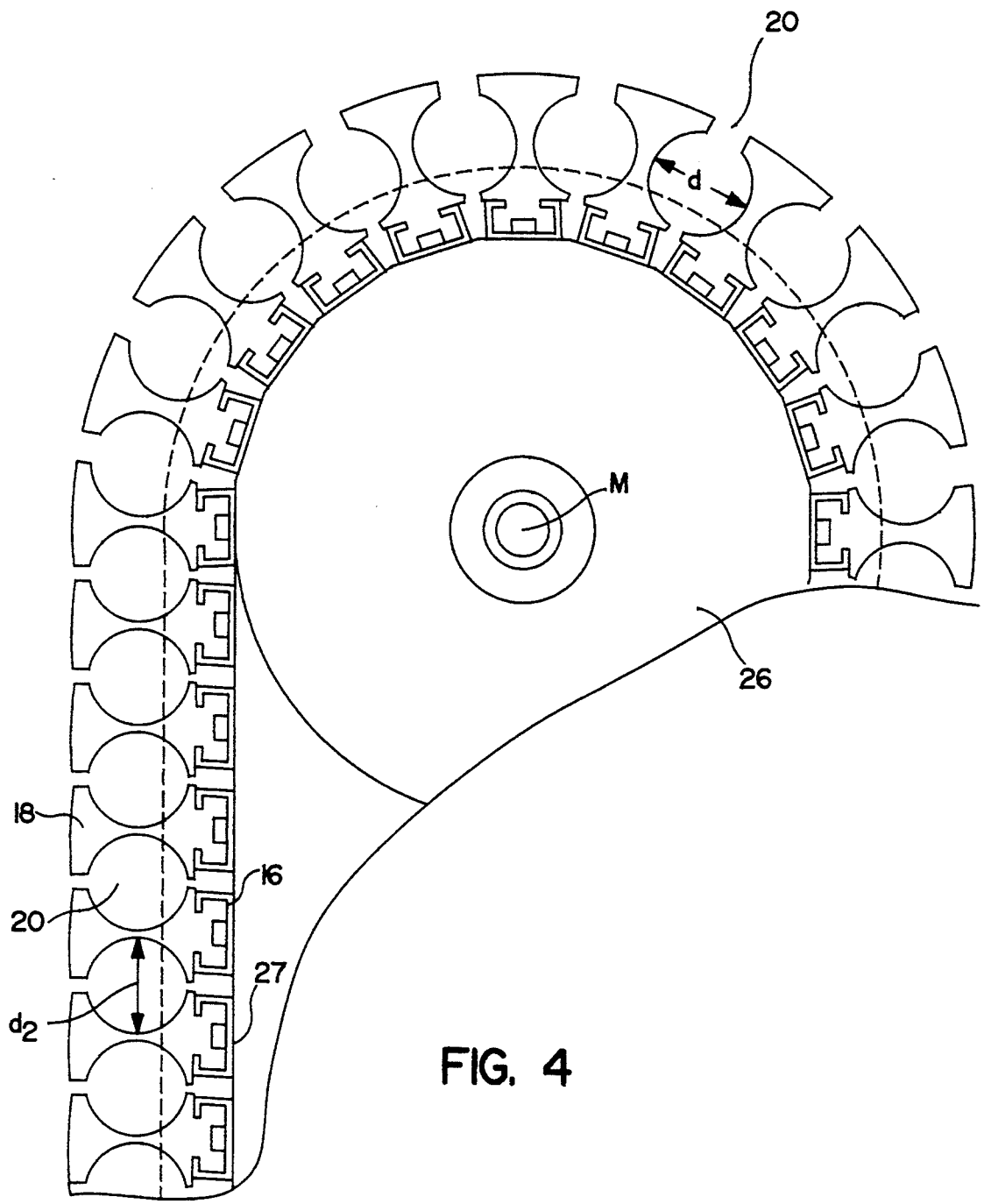
FIG. 4 shows a partially represented detail from a conveyor belt according to the invention for the transportation of cans through, for example, a washing zone and a rinsing zone.

In a further illustrative embodiment of the invention according to FIG. 4, a belt 27 is placed around an upper conveyor end 26, which belt (not shown) also loops as a continuous belt around a lower conveyor end. The profiles 16 and also the bars 18 are disposed on this belt. It can clearly be seen that, due to the arrangement and design of the bar, the circular receiving fixture 20 opens in the area above the horizontal plane of the midpoint M of the upper conveyor end 26, so that the diameter d widens there in relation to a diameter d2. As soon as the belt 27 then passes again into a straight section, the receiving fixture 20 closes, whereupon an inserted can 7 is clamped in place. This also however means that in this area a lateral guide plate, for example, becomes unnecessary, since the cans are prevented from floating out of the receiving fixture 20. It is possible, furthermore, as a result of this design, for the container 12 to be of smaller width but, in return, of higher construction. Despite a smaller spatial requirement in terms of width, this enables just as many or more cans to be accommodated on the belt 27 as on the roller 11.

Obviously, the belt 27 can also be guided over still more deflection rollers, depending on the spatial requirement and layout of the container 12. A protection against the cans floating off has to take place, at the very most, at the deflection points.

A roller 11 according to the invention or a belt 27 can also be used particularly as a delivery mechanism 3. This is indicated in FIG. 1 by the delivery mechanism 3a. Here too, the corresponding roller 11 is located on a rotary shaft 13 and exhibits the circular receiving fixtures 20. In the upper receiving fixture 20, there lies a can 7.

If cans are intended to be transferred, for example, from the transport chain 9 onto the conveyor chain 4, then a part of the transport chain 9 displaying two spikes 24 is indicated, from which cans 7 are suspended. The lower can 7 is subjected to compressed air from a nozzle 28, so that it is blown from the spike 24 into the receiving fixture 20. The shot of the can 7 is checked by a stop plate 29 located on the other side.

Upon the rotation of the roller 11, the can 7 then makes its way upwards, where there is disposed, opposite the stop plate 29, a further nozzle 30 which shoots the can 7 onto a spike 24 of the conveyor chain 4.

Figure 5:
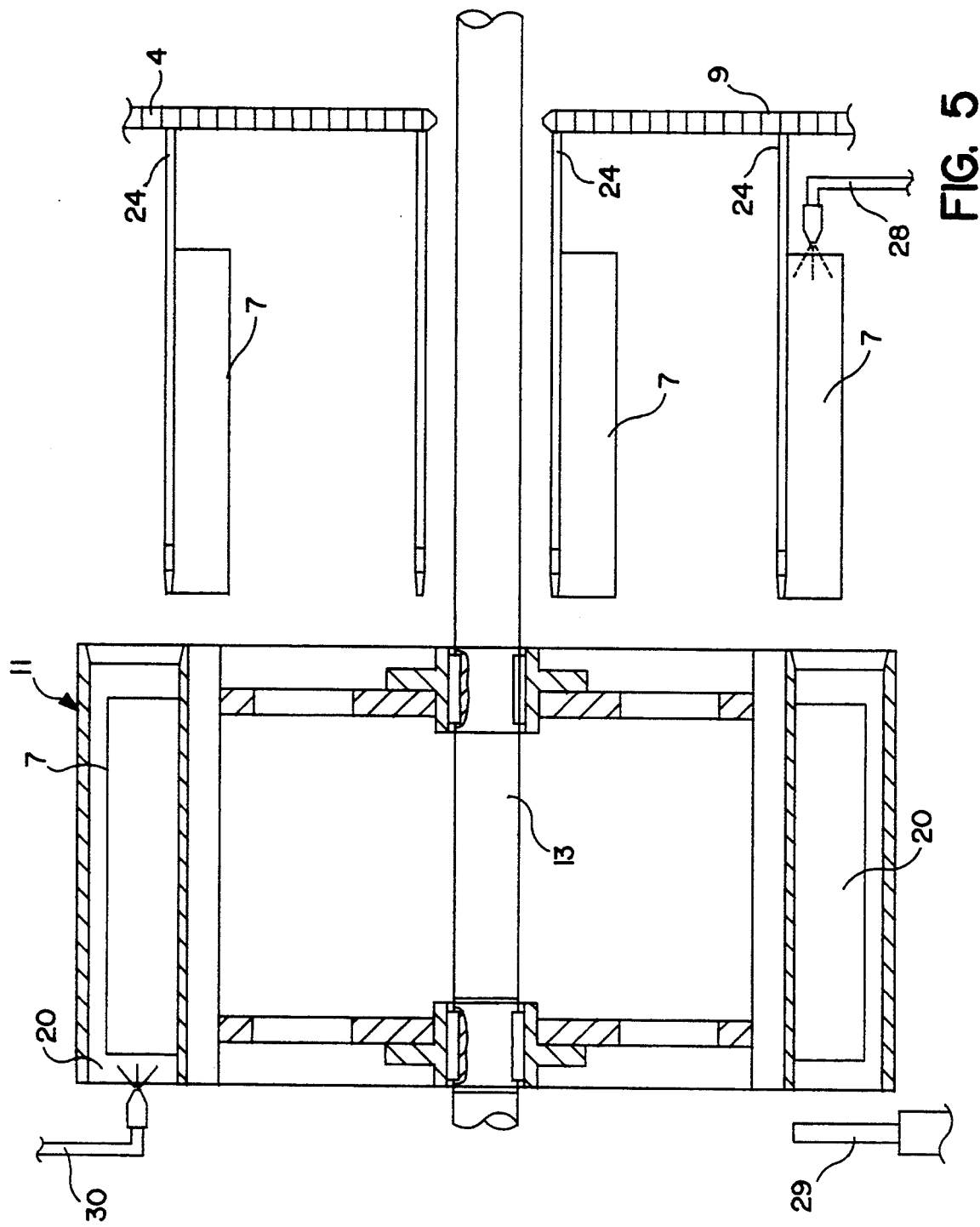
FIG. 5 shows a cross section through a delivery mechanism for cans according to the invention.

Obviously, in the case of rollers disposed in rinsing containers, a delivery by the last roller 11 in the rinsing container can also be effected, for example, by a delivery roller shown in FIG. 5. In this case, the last roller in the rinsing container is provided in place of the transport chain 9 in FIG. 5. This is intended to represent a further illustrative embodiment of the invention, still further applications of the roller or of the belt also being conceivable.

Figure 6:
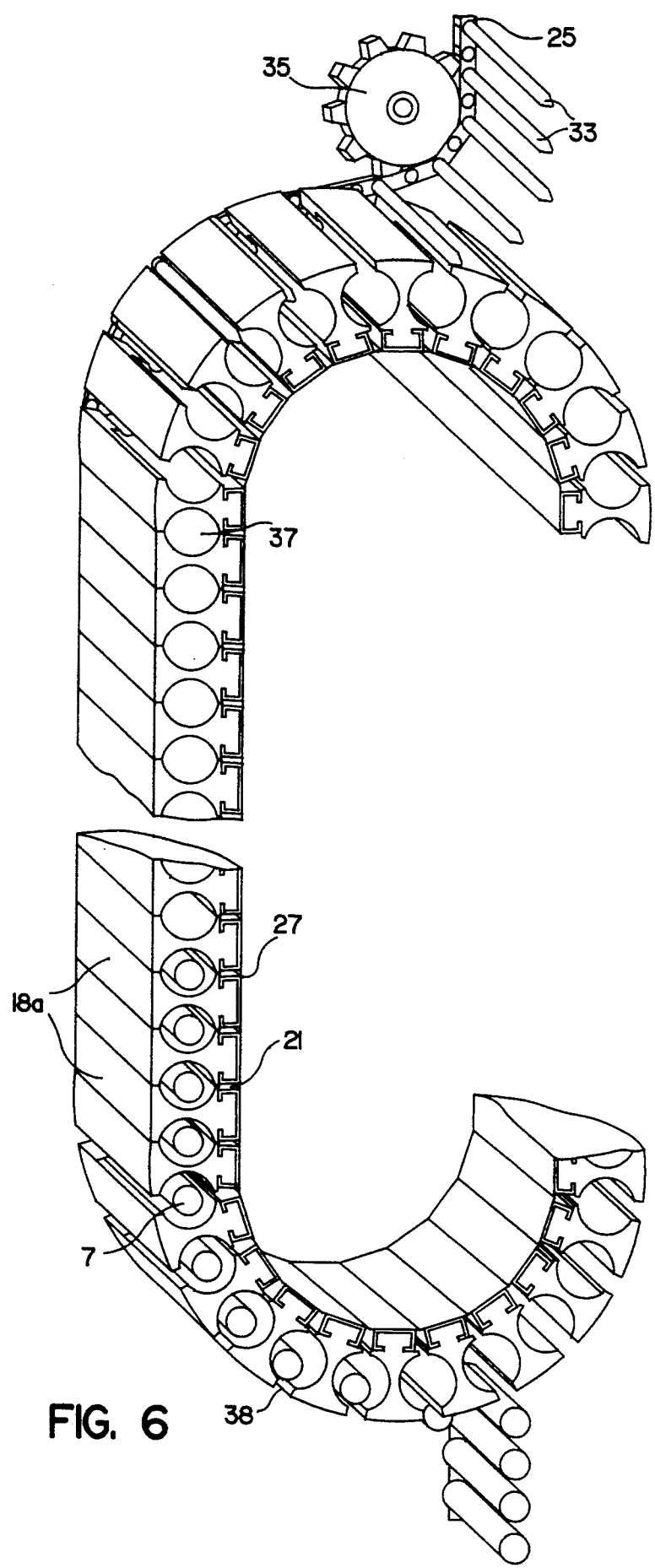
FIG. 6 shows a perspective view of a further illustrative embodiment of a delivery mechanism for cans according to the invention.
Figure 7:
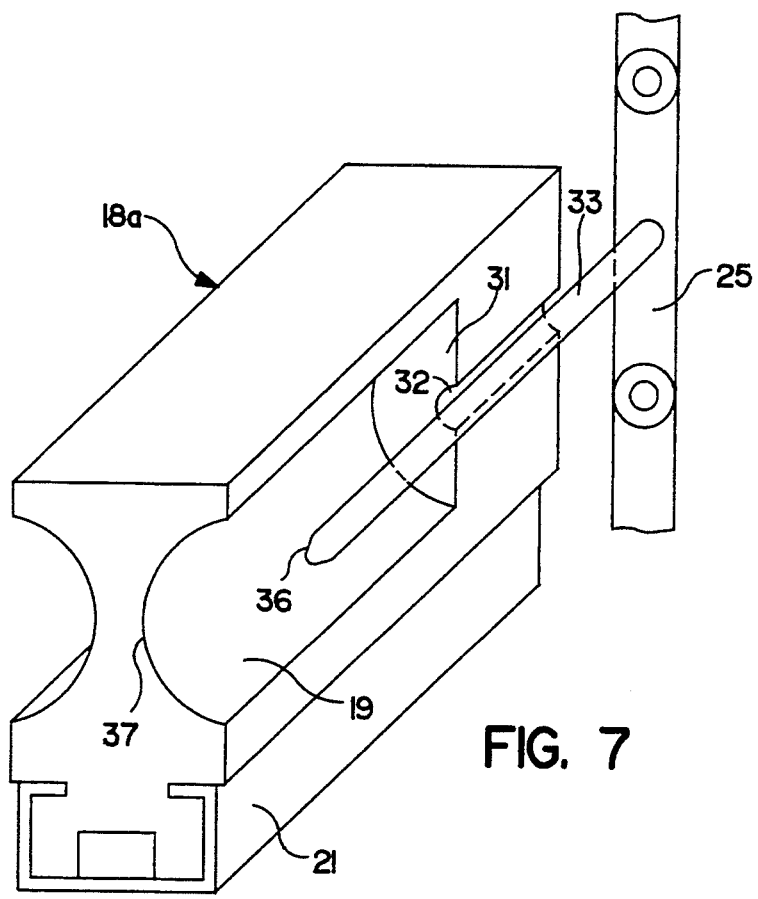
FIG. 7 shows a perspective view of an illustrative embodiment of a bar according to the invention in the usage position.

In a further illustrative embodiment of the invention according to FIG. 6, a slightly differently configured bar 18a is fastened to the belt 27 and held by corresponding claw strips 21. A bar 18a of this type can be seen even more clearly in FIGS. 7 and 8. In the front area, the bar 18a likewise possesses the concave depression 19 which is not, however, of continuous configuration but is closed off, in the rear area, by a filling 31. A semi-bore 32 is molded approximately centrically in this filling 31, which semi-bore forms, in conjunction with a further semi-bore 32 of the adjacent bar 18a, a bore for receiving a catching pin 33.

In terms of manufacturing methods, the filling 31 is preferably produced by there being no machine-cutting performed in this area in relation to the concave depression 19 but only in relation to the semi-bore 32.

Figure 8:
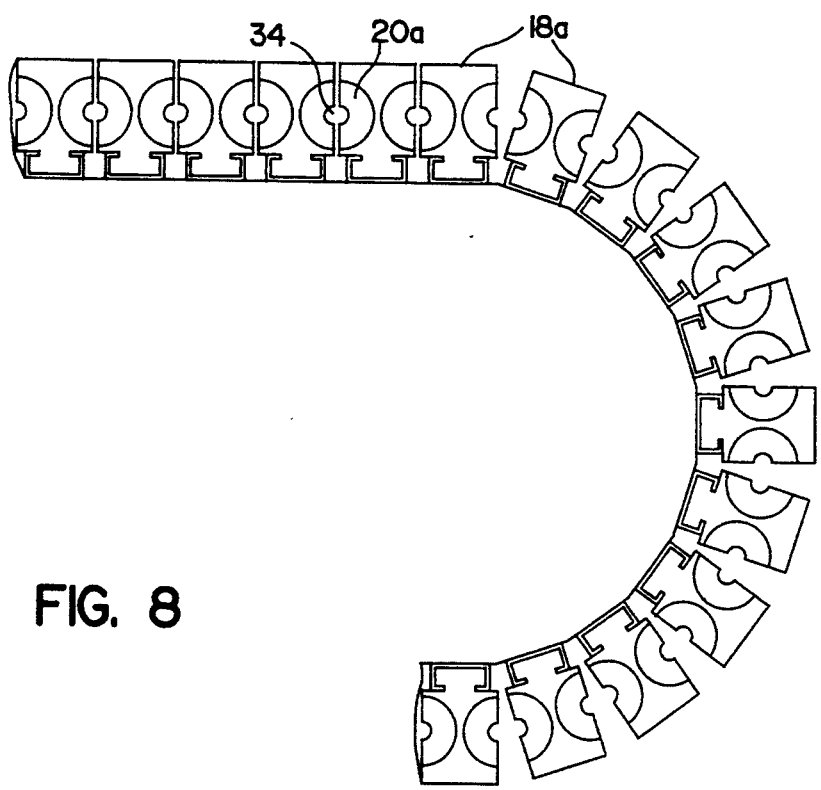
FIG. 8 shows a top view onto part of a delivery mechanism according to FIG. 6.

It can be seen in FIG. 8 that adjacent bars 18a close up after leaving an upper conveyor end, for example, or the like, so that not only is a circular receiving fixture 20a for the cans formed but also a bore 34 for the securement of the catching pin 33.

The catching pin 33 is secured on the chain 25 and serves to catch cans 7 exhibiting, in particular, only a small diameter. FIG. 6 illustrates how, for example, the chain 25 comes from above without any cans being located on the catching pins 33. The chain 25 then runs partly round a deflection roller 35, this deflection roller 35 guiding the chain 25 and the catching pins 33 such that the catching pins 33 make their way into the area of the closing semi-bores 32. This best occurs close to a crown of the belt 27, since it is there that the bars 18a are open widest. In its further progress, the chain is preferably guided secured, for example, to a gear rim, this gear rim running in conjunction with the upper conveyor end 26. Any offsetting of the chain in relation to the belt 27 is thereby prevented.

Upon the closure of the bars 18a, the semi-bores 32 of two adjacent bars 18a each clamp hold of a catching pin 33, a tip 36 of this catching pin 32 being located close to an opening 37 in the circular receiving fixture 20. If a can of smaller diameter is then delivered onto the belt 27 from, for example, a circular receiving fixture of a roller of the rinsing bath, then this occurs in a well guided manner since, for example, the can has not yet totally left the receiving fixture of the roller and is nevertheless already caught by the catching pin 33.

The semi-bores 32 which then produce the bore 34 do not necessarily have to be disposed centrically. Depending upon the diameter and the position in which the can is intended to be caught, the bore 34 can be situated at another location within the receiving fixture 20. Account can be taken here of every requirement.

Once the cans according to FIG. 6 have been caught by the catching pins 33, the belt loops round a lower conveyor end (not shown in greater detail), whereupon the bars 18a re-open. This opens up a slot 38 between two bars, which slot is larger than a diameter of the can 7. The can 7 is consequently able to slide out of the receiving fixture 20 and is fed onward, suspended from the catching pin 33, for further treatment or delivery.

Figure 2:
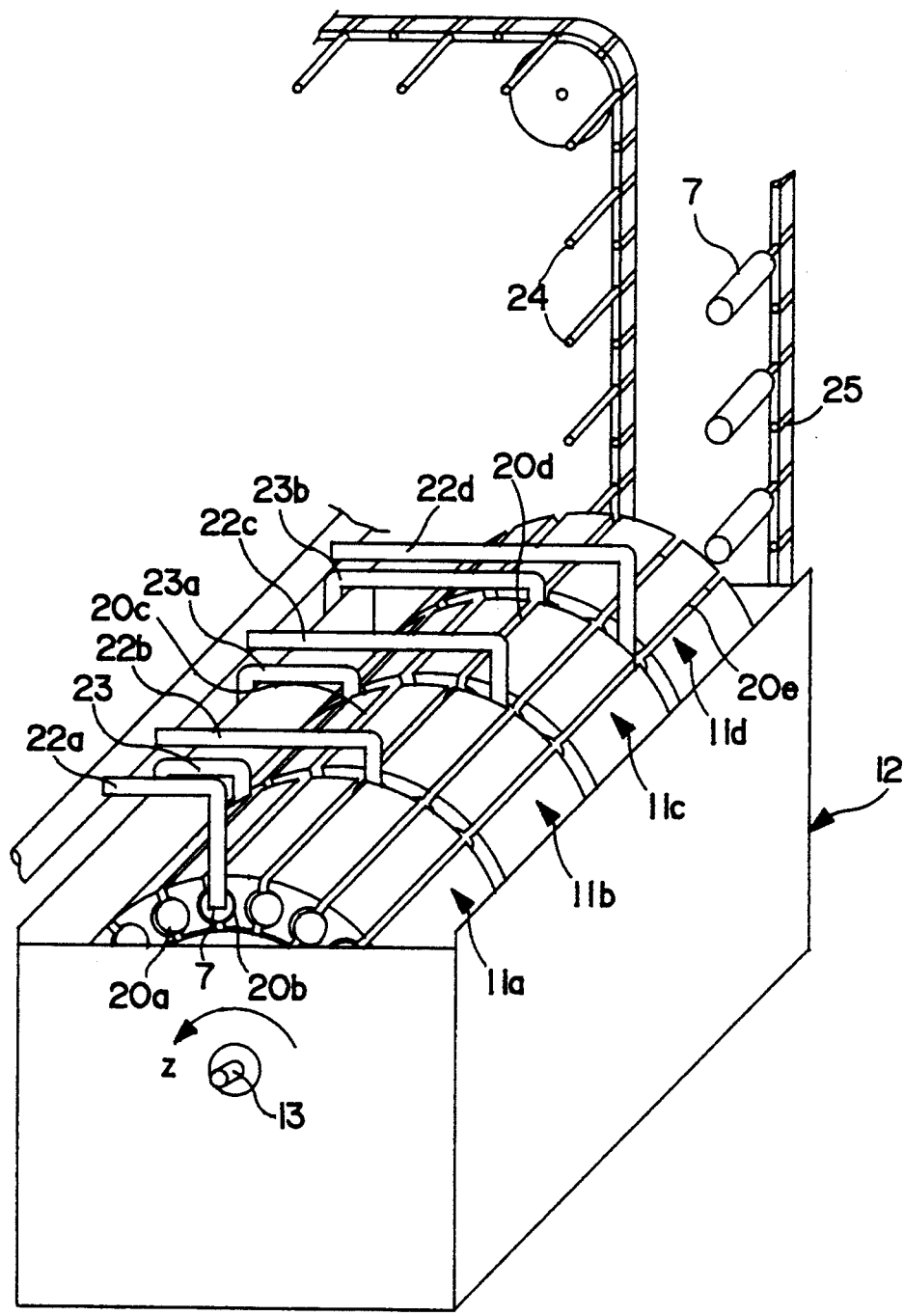
FIG. 2 shows a perspective representation of a detail from a washing machine according to FIG. 1.

Whereas, in FIG. 2, a roller arrangement is shown in which all the rollers are disposed on a common rotary shaft 13, rollers 11e, 11f and 11g are located, rotated by 90°, within a container 12a, the rollers 11f and 11g being disposed, for example, in a washing zone and the roller 11e in a rinsing zone. Each roller 11e, 11f and 11g has its own rotary shaft 13e, 13f and 13g, so that, in particular, any repair of the individual rollers is made substantially easier. Furthermore, no additional supports are necessary between the individual rollers, as might be required in the case of a continuous, long rotary shaft 13 according to FIG. 2. Maintenance and wear are reduced to a minimum.

Figure 10:
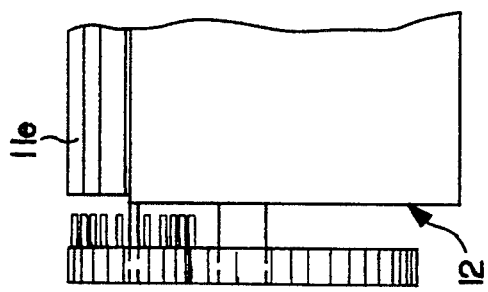
FIG. 10 shows an end view of the detail from the illustrative embodiment of a washing machine according to FIG. 9.
Figure 9:
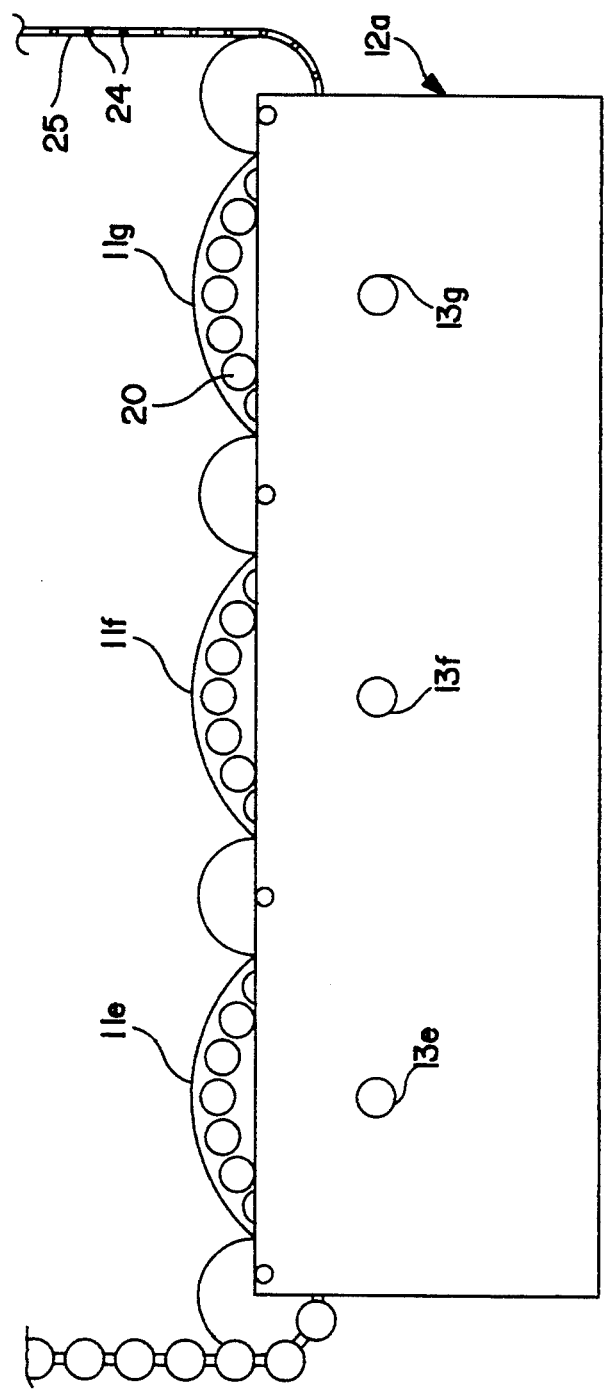
FIG. 9 shows a diagrammatic side view of a further illustrative embodiment of a detail from a washing machine.

The delivery of the can from one roller to the other is here effected by delivery onto a chain 25 displaying spikes 24, the chain 25 being guided via various deflection rollers (not shown in greater detail) such that it runs in wave formation between the individual rollers 11e, 11f and 11g. In this case, the chain 25 does not however run within the container 12a but outside it, as can be seen in FIG. 10.

The spikes 24 and the circular receiving fixtures 20 within the roller are matched such that a can is able to be shot into a first receiving fixture 20 which emerges over a container rim 29, whilst a can is being shot out of a receiving fixture 20 onto a spike 24, before the corresponding receiving fixture disappears behind the container rim 39. Obviously, a plurality of narrow rollers 11e, 11f and 11g can also be disposed one behind the other on the corresponding rotary shafts 13e and 13f and 13g, so that a can, by being onwardly transported into a different roller, is carried along in the corresponding bath.

Preferably, moreover, this chain 25 also runs into the drying oven 5, so that there is no longer any need here for an additional delivery.

I claim:

1. A device for the transportation of substantially hollow body objects, comprising delivery means, bars disposed in parallel on said delivery means, said bars having mutually aligned side walls exhibiting concave depressions, wherein each bar includes a filling adjoined to the concave depression, said filling having a semi-bore molded therein, wherein the semi-bores of two adjacent bars forms a bore for receiving a catching pin, thereby forming a receiving fixture for the hollow body of the object.

2. The device as claimed in claim 1, wherein the receiving fixture is configured having an approximately circular cross section and exhibits a diameter which is slightly greater than the diameter of the hollow body.

3. The device as claimed in claim 1, wherein the bar consists of a plastics material.

4. The device as claimed in claim 1, wherein the bar is held by claw strips of a profile, which profile is secured on the delivery means.

5. The device as claimed in claim 1, wherein the delivery means comprises a roller disposed on a rotary shaft.

6. The device as claimed in claim 1, wherein the delivery means comprises a belt which partially loops around at least an upper conveyor end and a lower conveyor end.

7. The device as claimed in claim 1, wherein there is assigned to at least one receiving fixture a nozzle for carrying the hollow body in or out by means of compressed air.

8. The device as claimed in claim 7, wherein, on the other side of the nozzle, a stop projects into the clear width of the receiving fixture.

9. The device as claimed in claim 1, wherein said delivery means transports said objects through a washing zone and a rinsing zone, each of said washing zone and said rinsing zone having disposed therein at least one delivery means with the bars.

10. The device as claimed in claim 9, wherein the delivery means is seated on a rotary shaft, the receiving fixtures being disposed in an axis parallel to the rotary shaft.

11. The device as claimed in claim 10, wherein all of said delivery means are seated on a rotary shaft which extends both through the washing zone and through the rinsing zone.

12. The device as claimed in claim 10, wherein each delivery means is disposed on its own rotary shaft which runs transversely to the direction of conveyance of the objects.

13. The device as claimed in claim 12, wherein at least one of said delivery means is seated behind another of said delivery means on its own rotary shaft.

14. The device as claimed in claim 12, wherein there is assigned to the delivery means a chain displaying spikes, by means of which each object makes its way from one delivery means to another delivery means.

15. The device as claimed in claim 14, wherein the chain also runs through a drying zone.

16. The device as claimed in claim 1, wherein the delivery means is disposed as a delivery mechanism between two chains.

17. The device as claimed in claim 1, wherein the delivery means is disposed as a delivery mechanism between a roller and a chain.

18. The device as claimed in claim 1, wherein the delivery means is disposed as a delivery mechanism between a belt and a chain.

* * * * *